July 21, 1964   A. G. HENRY ETAL   3,141,507
CURB TRIMMING MACHINE
Filed April 24, 1963   2 Sheets-Sheet 1

Albert G. Henry
Willard E. Johnson
INVENTORS

BY
Attorneys

July 21, 1964 A. G. HENRY ETAL 3,141,507
CURB TRIMMING MACHINE
Filed April 24, 1963 2 Sheets-Sheet 2
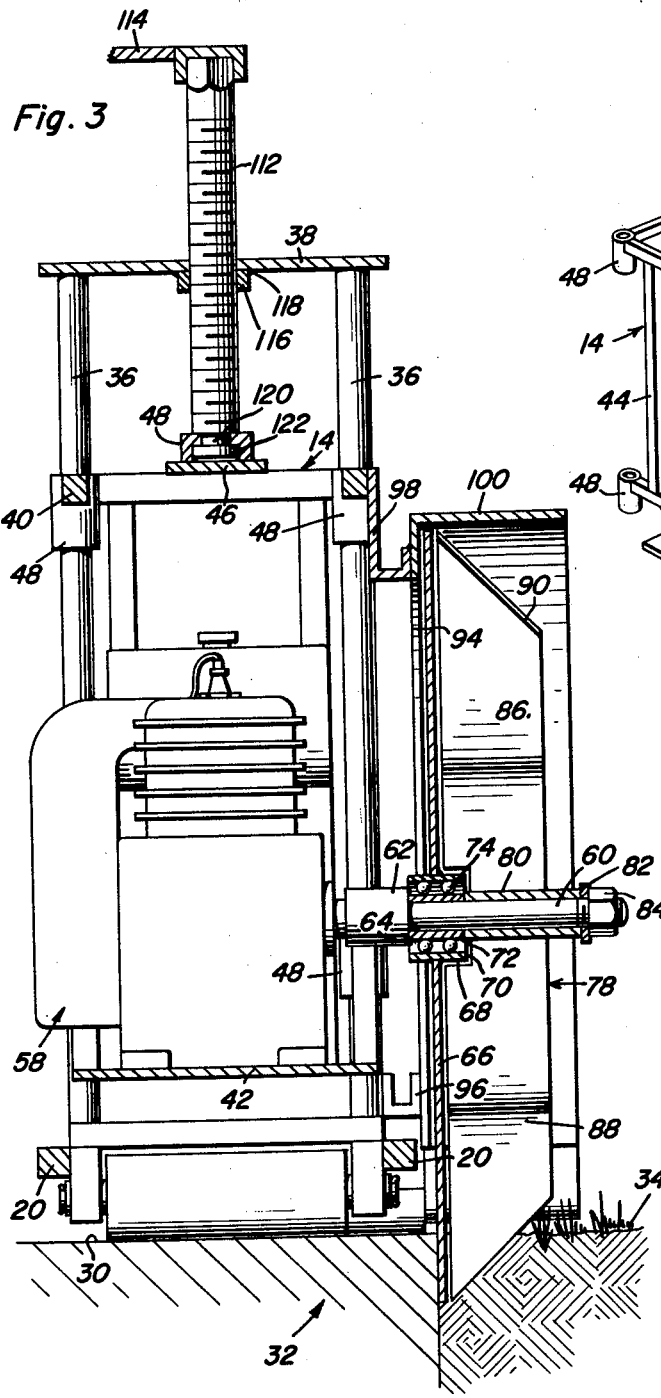
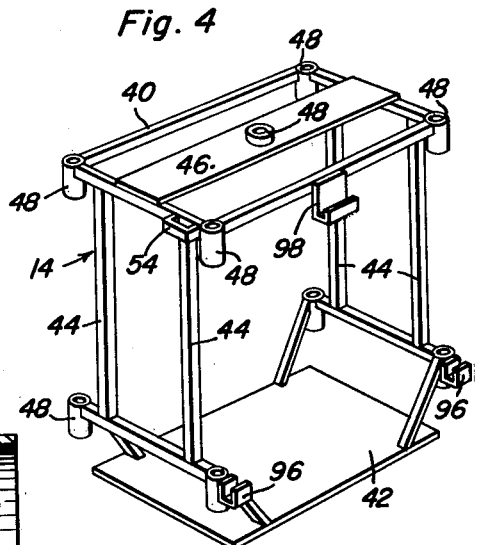
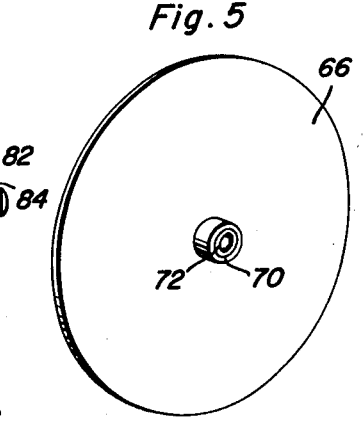
Albert G. Henry
Willard E. Johnson
INVENTORS
BY *James A. O'Brien*
and *Harvey B. Jackson*
Attorneys

3,141,507
CURB TRIMMING MACHINE
Albert G. Henry and Willard E. Johnson, both of
3610 Reagan St., Knoxville, Tenn.
Filed Apr. 24, 1963, Ser. No. 275,305
4 Claims. (Cl. 172—15)

This invention relates to a novel and useful curb trimming machine which has been designed primarily for the purpose of trimming grass areas along lengths of curbing or the like.

While some trimming machines have heretofore been designed, most of these have been hand-held and without a means for adjusting the depth of the cut of the cutter members thereof. In addition, most previous types of trimming machines are constructed in a manner whereby the debris resulting from the trimming operation is allowed to fall on the curb as well as the grass area which is being trimmed. This of course necessitates that a cleanup operation be performed after these inferior types of trimming machines have been utilized.

The main object of this invention is to provide a curb trimming machine constructed in a manner whereby it may be readily utilized with little effort to quickly trim grass areas adjacent substantially all types of curbing members and the like.

A further object of this invention, in accordance with the immediately preceding object, is to provide a curb trimming machine including means by which the machine may be rollingly supported from the curbing adjacent the grass area which is to be trimmed.

Yet another object of this invention is to provide a curb trimming machine constructed in a manner whereby the depth of the cut of the cutter members of the trimming machine may be readily adjusted so as to adapt the trimming machine for substantially all types of trimming operations, some trimming operations requiring deeper cuts than others.

Another object of this invention is to provide a curb trimming machine in accordance with the preceding objects constructed in a manner whereby the cutter members thereof will substantially completely pulverize the debris resulting from a trimming operation and discharge the pulverized debris across the grass area which is being trimmed.

An ancillary object of this invention is to provide a curb trimming machine in accordance with the preceding objects and constructed in a manner to eliminate substantially all possibility of the trimming machine throwing unpulverized particles of debris such as pebbles and the like in a dangerous manner.

A final object of this invention to be specifically enumerated herein is to provide a curb trimming machine in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged vertical transverse sectional view taken substantially upon the plane indicated by the section line 3—3 of FIGURE 1;

FIGURE 4 is a perspective view of the carriage of the trimming machine on somewhat of a reduced scale; and FIGURE 5 is a perspective view of the guard disk of the trimming machine which is adapted to be disposed between the cutting elements of the trimming machine and the curbing along which the trimming machine is being moved.

Figure 1:
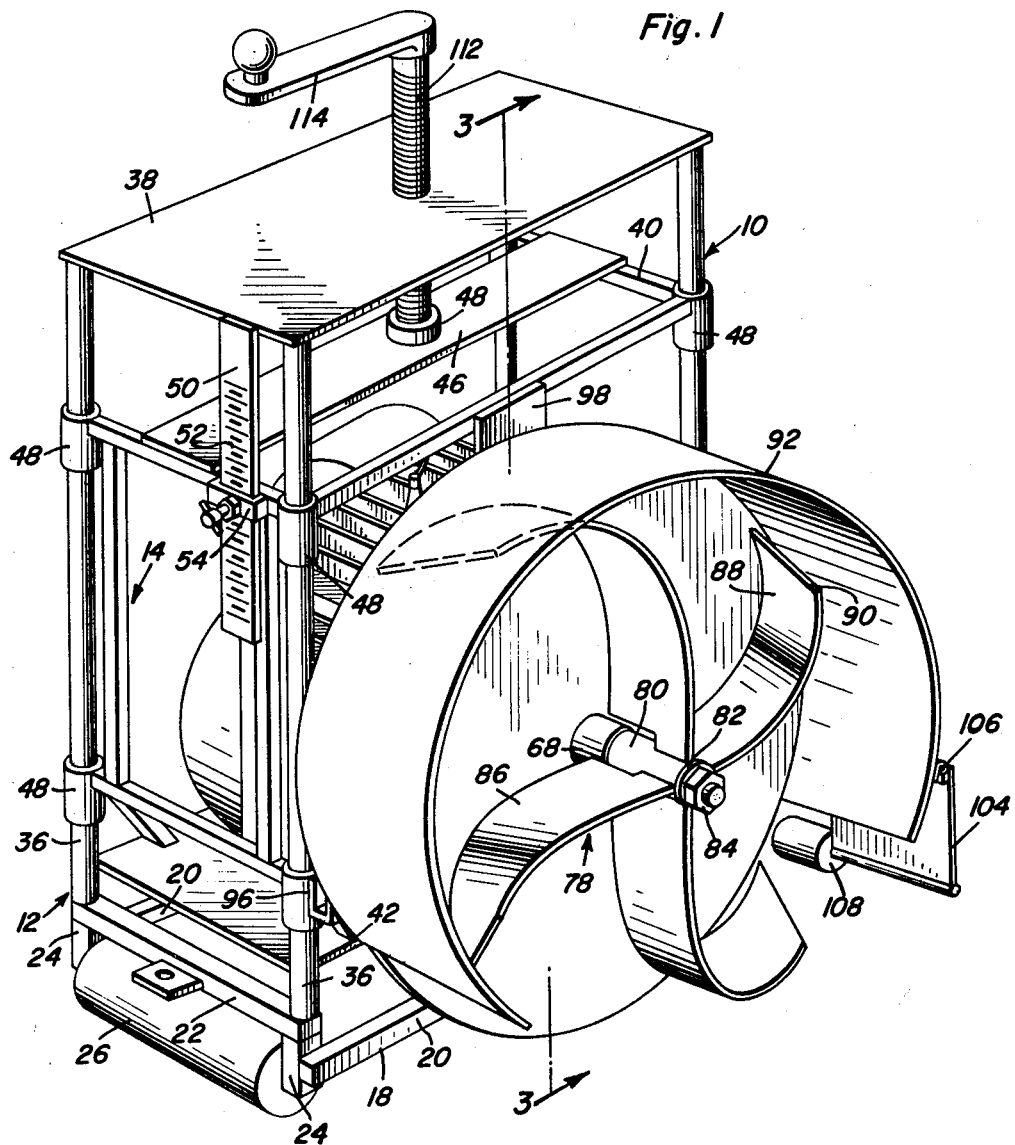
FIGURE 1 is a perspective view of the curb trimming machine of the instant invention.
Figure 2:
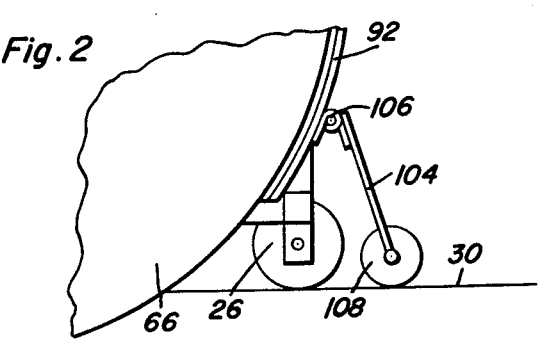
FIGURE 2 is an enlarged fragmentary side elevational view of the rear portion of the curb trimming machine showing the manner in which a hinged guard gate is provided for preventing unpulverized portions of debris such as small stones and pebbles from being thrown in a dangerous manner from the trimming machine.

Referring now more specifically to the drawings the numeral 10 generally designates the curb trimming machine of the instant invention. The machine 10 includes a support base generally referred to by the reference numeral 12 and a carriage generally referred to by the reference numeral 14 which is supported from the base 12 for vertical movement relative thereto.

As can best be seen from FIGURES 1 and 3 of the drawings the base 12 includes a roller supporting frame 18 including a pair of longitudinal members 20 interconnected at opposite ends by means of a pair of cross brace members 22. The cross brace members 22 each include a pair of depending legs 24 between which a supporting roller 26 is rotatably journaled. It therefore may be seen that the frame 18 may be rollingly supported from the upper surface 30 of a curbing member generally referred to by the reference numeral 32 disposed adjacent a grass plot 34.

The base 12 includes four upstanding cylindrical guide members 36 which are secured to and project upwardly from a corresponding end portion of the associated crossbeam or brace member 22. The upper ends of the guide members 36 are interconnected by means of a horizontally disposed brace or top 38 and it is to be understood that each pair of guide members 36 disposed at opposite ends of the frame 18 comprise an upright support means for supporting the carriage 14 for vertical movement relative to the frame 18.

The carriage 14 may best be seen in FIGURE 4 of the drawings as including an upper generally rectangular frame 40 and a lower bottom 42 interconnected by means of four uprights 44 at corresponding corners thereof.

The upper frame 40 includes a rigid longitudinal brace member 46 and it may be seen that the brace member 46 supports a journal 48 whose purpose will be hereinafter more fully set forth. The carriage 14 also includes a plurality of generally cylindrical guides 48 and it may be seen from FIGURE 1 of the drawings that the guides 48 are disposed in pairs of upper and lower guides with each pair of guides 48 slidably engaging the corresponding upstanding guide member 36 at points spaced vertically there along.

The top 38 includes a depending gage bar 50 having indicia 52 formed therein and a guide 54 is supported from the upper frame 40 and slidably receives the gage bar 50 and is thereby registrable therewith to indicate the proper vertical adjustment of the carriage 14 relative to the base 12.

As can best be seen from FIGURES 1 and 3 of the drawings a prime mover generally referred to by the reference numeral 58 is secured to the bottom 42 in any convenient manner. The prime mover 58 includes a generally horizontally disposed output shaft 60 including a diametrically enlarged portion 62 defining an abutment shoulder 64. A guard disk 66 has a bearing assembly 68 secured through its center and it may be seen that the bearing assembly 68 includes an outer race 70 which is separated from an inner race 72 by means of ball bearings 74. The bearing assembly 68 is slipped over the free end portion of the output shaft 60 and the inner race 72 thereof abuts the shoulder 64. Thereafter, a cutter wheel generally referred to by the reference numeral 78 and including a cylindrical hub 80 is rotatably disposed on the free end of the output shaft 60 with the inner end of the hub 80 abutting the outer end of the inner race 72. Thereafter, a thrust washer 82 and a nut 84 are secured on the externally threaded free terminal end portion of the output shaft 60. It will therefore be seen that the guide disk 66 is rotatable relative to the carriage 14 as well as the output shaft 60 and that the outer face of the inner race 72 and the inner face of the thrust washer 82 comprise thrust bearing surfaces between which the cylindrical hub 80 of the cutter wheel 78 is held captive.

The cutter wheel 78 includes a plurality of generally radially outwardly projecting strap-like blades 86 and it will be seen that each blade 86 is curved in the direction of rotation of the output shaft 60 at its free end portion as at 88. In addition, the free terminal end portions of the blades 86 are beveled toward the guide disk 66 as at 90.

A generally cylindrical guard 92 and including a disk-like inner end wall 94 is secured to the carriage 14 in any convenient manner such as by a plurality of mounting straps 96 and 98, see FIGURES 1, 3 and 4.

The annular or disk-like rear wall 94 and the cylindrical wall portion 100 of the guard 92 are cutaway at their lower peripheral portions to form an opening through which the lower periphery of the blades 86 may project. It will be noted that the inner side edges of the blades 86 are disposed closely adjacent the outer surface of the guide disk 66 and that the effective diameter of the cutter wheel 78 is substantially identical to the diameter of the cutter disk 66.

It is to be understood that the curb trimming machine 10 is to be advanced to the left as viewed in FIGURE 1 of the drawings and it may be seen that a guard or shield 104 is provided and pivotally secured to the cylindrical wall portion 100 by means of a hinge 106. The lower free edge portion of the guard 104 is provided with a roller 108 for rolling contacting engagement with the upper surface 30 of the curbing member 32. The guard 104 will of course prevent unpulverized portions of the debris resulting from a trimming operation from flying to the rear of the curb trimming machine in a dangerous manner.

As can best be seen from FIGURE 1 of the drawings the upper end of a screw member 112 is provided with a crank arm 114. The screw member 112 is threadingly engaged through a nut 116 secured to the undersurface of the top 38 in any convenient manner such as by welding 118. The lower terminal end portion of the screw shaft 112 includes a diametrically reduced portion 120 which in turn defines a generally radially outwardly projecting flange 122 on the lower terminal end portion of the screw member. This flange portion 122 is held captive within the journal 48 carried by the brace member 46 of the carriage 14. Thus, if it is desired to reduce the depth of the cut effected by the cutter wheel 78, the screw shaft 112 may be rotated in a direction to raise the carriage 14 relative to the base 12.

In operation, after the correct depth of cut has been set, the curb trimming machine 10 is rolled along the upper surface 30 of the curbing member 32 in the manner illustrated in FIGURE 3 of the drawings with the cutter wheel 78 projecting below the upper surface 30. The blades 86 bite into the grass plot 34 immediately adjacent the curbing member 32 and thereby accurately trim the grass plot 34. Inasmuch as the outer ends of the blades 86 are curved as at 88, the debris cut from the grass plot 34 by the blades 86 is first pulled radially inwardly of the cutter wheel 78 and is then discharged axially of the wheel 78 away from the frame 12 inasmuch as the guard disk 66 will prevent the discharge of debris and the like inwardly of the machine 10. The gage bar 50 may be utilized to accurately determine the correct positioning of the carriage 14 relative to the base 12 and the pivoted guard 104 will prevent larger particles of debris from being thrown rearwardly onto the legs of the operator of the machine 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A curb trimming machine comprising a support base including depending rolling support means adapted to rollingly support said base from and for movement along one marginal edge portion of a length of curbing or the like, a carriage, guide means carried by said base and guidingly supporting said carriage from said base for vertical movement relative to the latter, a motor driven drive shaft journaled from said carriage and including one end portion projecting outwardly of one side of said base having a bladed cutter wheel mounted thereon for rotation therewith, said support base including means engaged with said carriage for vertically adjusting said carriage relative to said base between a raised inoperative position and a lowered operative position with the lower periphery of said cutter wheel disposed below the lowermost extremities of said rolling support means said support base including front and rear upstanding supports defining said guide means and between which said carriage is received, horizontal brace means interconnecting the upper ends of said supports, said means for vertically adjusting said carriage comprising an upstanding screw shaft threadedly received through said brace means and journaled in an upper portion of said carriage at its lower end against axial shifting relative to said carriage, a full generally circular guard disk disposed inwardly of said cutter wheel and rotatably supported from said carriage for free rotation about an axis coinciding with the axis of rotation of said shaft and relative to the latter, said bladed cutter wheel including a plurality of generally strap-like blades extending generally radially outwardly of said shaft, the free end portions of said blades being beveled toward said disk, a horizontally disposed generally cylindrical guard supported and projecting longitudinally outwardly from said carriage and enclosing said disk and cutter wheel, said cylindrical guard having its lower peripheral portion cut away and including an annular inner end wall projecting radially inwardly from the inner surfaces of said guard through which said drive shaft projects, the diameter of the inner periphery of said inner end wall being less than the diameter of said guard disk, the latter being disposed closely adjacent and outwardly of said annular inner end wall, and of a diameter at least substantially equal to the diameter of the circular path through which the outer ends of said blades swing, and the lower end of said annular end wall being cut away and conforming to the cutaway portion of said cylindrical guard.

2. The combination of claim 1 inclding a prime mover supported from said carriage and including a generally horizontally disposed output shaft comprising said drive shaft.

3. The combination of claim 1 including a crank handle carried by the portion of said screw shaft disposed above said brace means whereby said screw shaft may be readily rotated to raise or lower said carriage.

4. The combination of claim 1 wherein said carriage and support base include coacting gage means for indicating the depth of the cut of said cutter wheel below said rolling support means.

References Cited in the file of this patent

UNITED STATES PATENTS

| | | |
|---|---|---|
| 1,903,124 | Miller et al. | Mar. 28, 1933 |
| 1,970,838 | Buettner | Aug. 21, 1934 |
| 2,342,031 | Bagan | Feb. 15, 1944 |
| 2,882,977 | Smith et al. | Apr. 21, 1959 |
| 2,913,058 | Smith et al. | Nov. 17, 1959 |
| 2,979,837 | Hunter | Apr. 18, 1961 |
| 3,018,117 | Bechard | Jan. 23, 1962 |

FOREIGN PATENTS

| | | |
|---|---|---|
| 482,569 | France | Jan. 5, 1917 |